United States Patent
Zhang

(10) Patent No.: US 11,948,359 B2
(45) Date of Patent: Apr. 2, 2024

(54) VIDEO PROCESSING METHOD AND APPARATUS, COMPUTING DEVICE AND MEDIUM

(71) Applicant: BOE TECHNOLOGY GROUP CO., LTD., Beijing (CN)

(72) Inventor: Wenhao Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 259 days.

(21) Appl. No.: 17/478,314

(22) Filed: Sep. 17, 2021

(65) Prior Publication Data
US 2022/0237400 A1    Jul. 28, 2022

(30) Foreign Application Priority Data
Jan. 27, 2021    (CN) .......................... 202110111155.2

(51) Int. Cl.
G06V 20/40    (2022.01)
G06F 18/25    (2023.01)
G06T 5/70    (2024.01)

(52) U.S. Cl.
CPC ............ *G06V 20/41* (2022.01); *G06F 18/254* (2023.01); *G06T 5/70* (2024.01); *G06V 20/46* (2022.01); *G06T 2207/10016* (2013.01)

(58) Field of Classification Search
CPC ........ G06V 20/41; G06V 20/46; G06V 10/34; G06F 18/254; G06T 5/002; G06T 2207/10016
See application file for complete search history.

(56) References Cited

FOREIGN PATENT DOCUMENTS

| CN | 103426176 A | 12/2013 |
|---|---|---|
| CN | 110347875 A | 10/2019 |

OTHER PUBLICATIONS

"Jiewan Zheng et. al., Deep Ensemble Machine for Video Classification, IEEE Transactions on Neural Networks and Learning Systems, vol. 30, No. 2, Feb. 2019" (Year: 2019).*
"Zeeshan Rasheed et. al., Scene Detection in Hollywood Movies and TV shows, Proceedings of the 2003 IEE Computer Society Conference on Computer Vision and Pattern Recognition, 2003" (Year: 2003).*
"Behzad Shahraray, Scene Change Detection and Content-Based Sampling of Video Sequences, Proc. SPIE 2419, Digital Video Compression: Algorithms and Technologies 1995, Apr. 1995" (Year: 1995).*
"Anil M. Cheriyadat et. al., Learning Scene Categories from High Resolution Satellite Image, Conference: Computer Vision and Pattern Recognition Workshop 2011, Colarado Springs, CO, USA, IEEE CVPR 2011 Workshops, 2011" (Year: 2011).*

(Continued)

*Primary Examiner* — Andrae S Allison
*Assistant Examiner* — Phuong Hau Cai
(74) *Attorney, Agent, or Firm* — Myers Bigel, P.A.

(57) ABSTRACT

A video processing method and apparatus, a computing device and a computer readable storage medium are disclosed. The video processing method includes obtaining a video frame sequence comprised in a video to be processed, performing scene classification identification on the video frame sequence so as to obtain a scene classification identification result of the video frame sequence, and performing a smoothing process to the video frame sequence based on the scene classification identification result.

12 Claims, 7 Drawing Sheets

(56) References Cited

OTHER PUBLICATIONS

"Benjamin Bach et. al., Time Curves: Folding Time to Visualize Patterns of Temporal Evolution in Data, IEEE Transactions on Visualization and Computer Graphics, vol. 22, No. 1, Jan. 2016" (Year: 2016).*

"Tamami Nakano et. al., Synchronization of spontaneous eyeblinks while viewing video stories, Proceedings of The Royal Society, Proc. R. Soc. N 2009, 276, 3635-3644, Jul. 2009" (Year: 2009).*

* cited by examiner

VIDEO PROCESSING METHOD AND APPARATUS, COMPUTING DEVICE AND MEDIUM

RELATED APPLICATION

The present application claims the benefit of Chinese Patent Application No. 202110111155.2, filed on Jan. 27, 2021, the entire disclosures of which are incorporated herein by reference.

TECHNICAL FIELD

The present disclosure relates to the field of video image processing technology, particularly to a video processing method and apparatus, a computing device and a computer readable storage medium.

BACKGROUND

With the development of the multimedia technology, a large amount of video data is growing at an explosive speed. The video and image processing technology is widely applied as the basis of multimedia information understanding and recognition. One application of video processing is frame picture processing on each video frame constituting the video stream. When frame picture processing is performed on the video frame, in related technologies, corresponding frame picture adjustment (such as image enhancement) is generally made according to the video scene to which the video frame belongs. However, such a frame picture processing may cause the problem that the processing effect is not ideal, particularly, visual jump may be formed at the scene transformation position of video stream, as a result, the playback effect of the processed video is poor.

SUMMARY

In view of the above defects or deficiencies in relevant technologies, the present disclosure provides a video processing method and apparatus, a computing device and a computer readable storage medium, for solving the above problem of visual jump caused by frame picture adjustment to the video.

According to an aspect of the present disclosure, a video processing method is provided, comprising: obtaining a video frame sequence comprised in a video to be processed; performing scene classification identification on the video frame sequence so as to obtain a scene classification identification result of the video frame sequence; performing a smoothing process to the video frame sequence based on the scene classification identification result.

According to another aspect of the present disclosure, a video processing apparatus is provided, comprising: an obtaining module, configured to obtain a video frame sequence comprised in a video to be processed; an identification module, configured to perform scene classification identification on the video frame sequence so as to obtain a scene classification identification result of the video frame sequence; a processing module, configured to perform a smoothing process to the video frame sequence based on the scene classification identification result.

According to a further aspect of the present disclosure, a computing device is provided, comprising: one or more processors; and one or more memories with instructions stored thereon, which instructions, when executed on at least one of the one or more processors, cause the at least one processor to carry out the video processing method according to some embodiments of the present disclosure.

According to yet another aspect of the present disclosure, a non-transitory computer readable storage medium is provided with computer readable instructions stored thereon which, when executed, carry out the video processing method according to some embodiments of the present disclosure.

In the video processing method according to some embodiments of the present disclosure, by performing a smoothing process to the video frame sequence based on the scene classification identification result, video frames (i.e., video frames to be processed, e.g., one or more video frames near the scene switching position) that need to be processed due to scene switching can be detected. Subsequently, the video frame to be processed is smoothed based on the scene classification identification result (particularly the switched scene and the classification probability vector of the corresponding video frame to be processed), so that the processed video frame sequence transitions naturally and smoothly before and after scene switching, so as to avoid the problem of visual jump at the video scene transformation position caused by frame picture adjustment or processing such as image enhancement (especially within the same shot), thereby making the processed video natural and smooth in the playback process, and significantly improving the user viewing experience.

BRIEF DESCRIPTION OF THE DRAWINGS

By reading the detailed description on the non-limiting embodiments made with reference to the following drawings, other features, purposes and advantages of the present disclosure will become more obvious.

DETAILED DESCRIPTION OF THE DISCLOSURE

Figure 1:
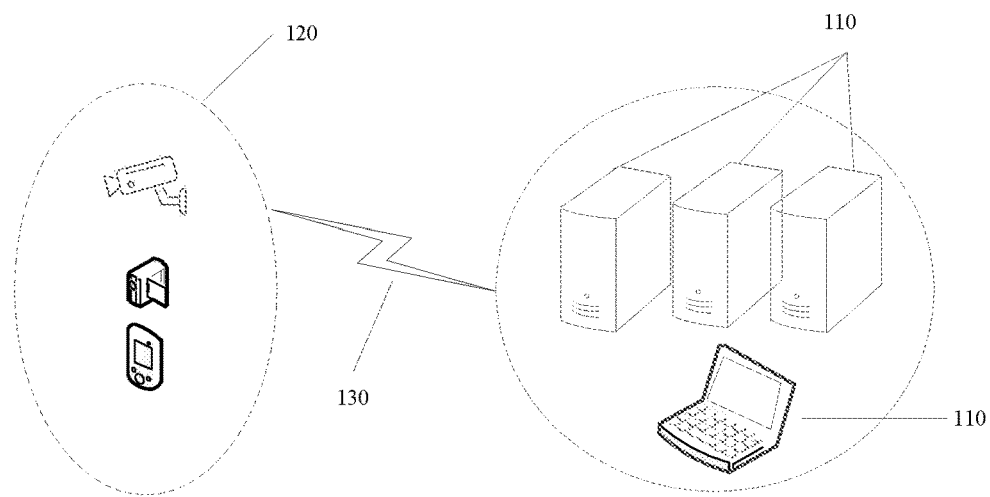
FIG. 1 shows an example application scene of a video processing method according to some embodiment of the present disclosure.

Several embodiments of the present disclosure will be further described in detail below in combination with the accompanying drawings so as to enable those skilled in the art to carry out the present disclosure. The present disclosure can be embodied as many different forms and purposes and should not be limited to the embodiments elaborated herein. These embodiments are provided to make the present disclosure comprehensive and complete, and fully communicate the scope of the present disclosure to those skilled in the art. Said embodiments do not limit the present disclosure.

It will be appreciated that although the terms such as first, second, third can be used herein for describing various elements, components and/or parts, these elements, components and/or parts should not be limited by these terms. These terms are only used to distinguish one element, component and/or part from another. Therefore, the first element, component or part discussed below can be called the second element, component or part without deviating from the teaching of the present disclosure.

The terms used herein are for the purpose of describing specific embodiments only and are not intended to limit the present invention. As used herein, the singular forms "a", "one" and "the" intend also include plural forms, unless otherwise instructed in the context clearly. It will be further understood that the terms "comprise", "include" and/or "contain", when used in this specification, specify the presence of the described features, entirety, steps, operations, elements and/or components, while not excluding presence of one or more other features, entirety, steps, operations, elements, components and/or groups thereof or adding one or more other features, entirety, steps, operations, elements, components and/or groups thereof. As used herein, the term "and/or" includes any and all combinations of one or more of the associated listed items.

Unless otherwise defined, all terms (including technical terms and scientific terms) used herein have the same meanings as generally understood by the ordinary skilled person in the art to which the present invention belongs. It will be further appreciated that terms such as those defined in commonly used dictionaries should be interpreted as having meanings consistent with their meanings in the relevant field and/or in the context of this Specification, and will not be interpreted in an idealized or overly formal sense unless explicitly defined herein. It should be noted that in the event of not conflicting, the embodiments in the present disclosure and the features in the embodiments can be combined with each other.

An important aspect of video processing is processing respective static video frames in the video frame sequence constituting the video obtained after serializing the video, so as to improve the video quality. For example, in order to improve the video quality (such as removing noise or improving clarity), image processing such as image enhancement (e.g., color enhancement) and recovery can be performed on the frame picture of the video frame. When frame picture processing is performed on the video frame, in related technologies, corresponding frame picture adjustment is generally made according to the video scene to which the video frame belongs. However, simply adjusting the video frame according to the video scene may result in visual jump when the video scene changes (especially within the same shot). For example, when frame picture processing is performed for a long shot that may contain more content (i.e., multiple video scenes) in the video, such a method of performing frame picture processing or adjustment according to the video scene to which the video frame belongs in the related technologies may result in obvious visual jump or mutation (e.g., in terms of color, brightness etc.) of the processed frame pictures at the scene transformation position of the video stream, thus, the playback effect and viewing experience of the processed video are poor.

For instance, when processing the video data, if the video data contains changes from indoor scene to outdoor scene, the image processing for video data includes image enhancement (e.g., color adjustment) processing for the frame image corresponding to the indoor scene and image enhancement processing for the frame image corresponding to the outdoor scene. However, image enhancement processing of different scenes may result in visual jump (e.g., color jump) between frame images of different scenes. Especially when there are different video scene changes or switches under the same video shot, the image enhancement such as color enhancement processing for different video scenes may make the visual jump problem more obvious. The purpose of image enhancement is to improve the image quality, such as removing the noise and improving the clarity of the image. The color adjustment or color enhancement herein refers to performing color enhancement processing on the pixels in the frame image in the video data, so as to make the color characteristic of the frame image more significant. For example, making bright ones brighter, making dark ones darker, and making bright-coloured ones more bright-coloured.

The present disclosure, with respect to the visual jump problem at the video scene transformation position caused by frame picture processing in the process of video processing (especially within the same shot), puts forth a video processing method based on scene classification identification, which performs a smoothing process to the video frames near the scene switching position based on the scene classification identification result, thereby avoiding visual jump in the process of video playback caused by video processing (especially frame picture processing).

FIG. 1 shows an example application scene of a video processing method according to some embodiments of the present disclosure, i.e., a video processing system 100. As shown in FIG. 1, the video processing system 100 may comprise one or more video processing devices 110, one or more video (or image) collecting devices 120 and a network 130 for connecting the video processing device 110 and the video collecting device 120. In some embodiments, the video processing device 110 can be used for carrying out the video processing method according to some embodiments of the present invention. For example, the video processing device 110 can be deployed with corresponding programs or instructions for performing various methods provided by the present invention.

As shown in FIG. 1, the video processing device 110 can be a single server or a server cluster or a cloud server or a distributed system, or can be a cloud server capable of providing basic cloud computing services such as cloud services, cloud databases, cloud computing, cloud functions, cloud storage, network services, cloud communication, middleware services, domain name services, safety services, CDN, and big data and artificial intelligence platform etc. It should be appreciated that the servers mentioned herein are typically server computers with a large amount of memory and processor resources, however, other embodiments are also possible. Optionally, as shown in FIG. 1, the video processing device 110 may also be any type of mobile computing device such as a notebook computer, including for example a mobile computer (e.g., personal digital assistant (PDA), laptop computer, tablet computers, netbooks), a mobile telephone (e.g., a cellular telephone, a smart phone etc.), a wearable computing device (e.g., a smart watch, a headset device, including smart glasses) or other types of mobile device. In some embodiments, the video processing device 110 can also be a fixed computing device, e.g., a desktop computer, a game player, a smart television etc.

As shown in FIG. 1, the video collecting device 120 can be any device capable of collecting videos or images, including but not limited to various types of camera, video camera (e.g., professional video camera or digital video camera etc.), camera (e.g., independent camera, built-in camera in a computing device or a mobile terminal etc.), video recorder etc.

The network 130 can include a wireless network or a wired network, using standard communication technologies and/or protocols over the wireless network or the wired network. The example of the network 130 generally includes Internet, and may also be any other networks, including but not limited to Local Area Network (LAN), Metropolitan Area Network (MAN), Wide Area Network (WAN), Personal Area Network (PAN), mobile communication network, dedicated network, or virtual dedicated network, or any combination of the above types of network. Each of the video processing device 110 and the video collecting device 120 can include at least one communication interface (not shown) capable of performing communication via the network 130. Such communication interfaces can be one or more of the following: any type of network interface (e.g., network interface card (NIC)), a wired or wireless (such as IEEE 802.11 wireless LAN (WLAN)) interface, a World Interoperability for Microwave Access (Wi-MAX) interface, an Ethernet interface, a universal serial bus (USB) interface, a cellular network interface, a Bluetooth™ interface, a near field communication (NFC) interface etc.

Figure 2:
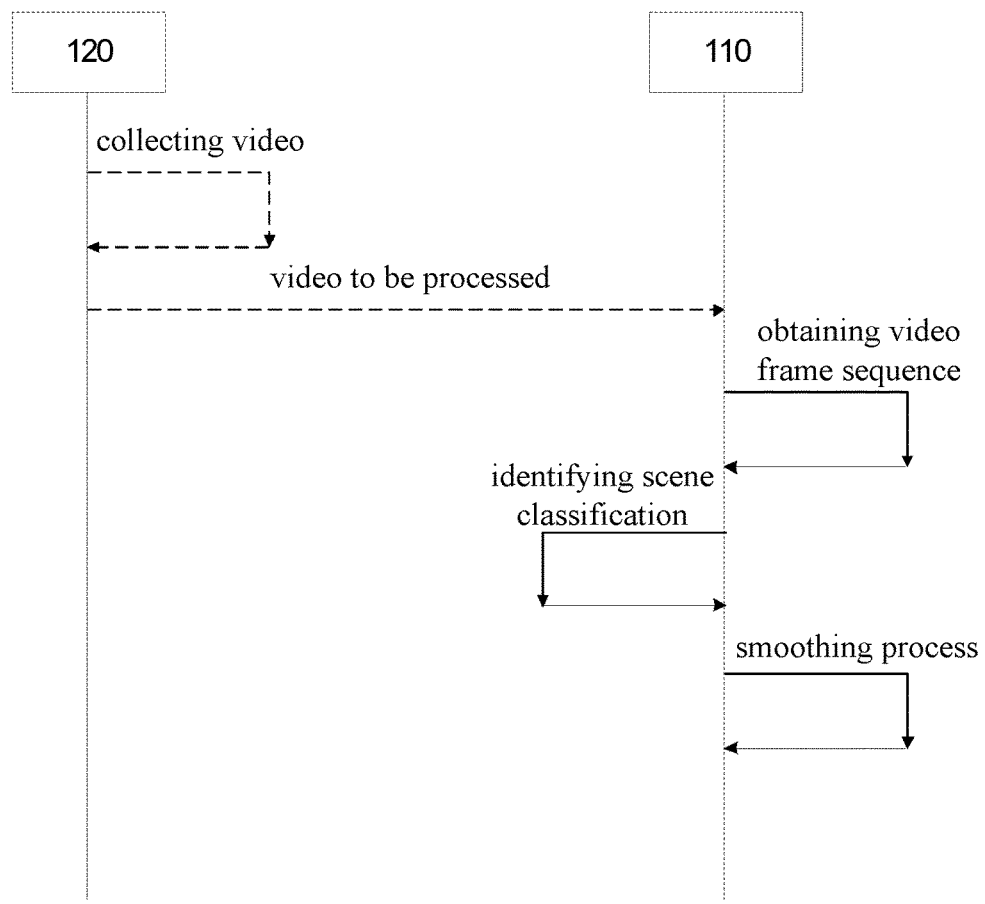
FIG. 2 shows an example architecture of a video processing system according to some embodiments of the present disclosure.

FIG. 2 shows an example architecture of the video processing system 100 according to some embodiments of the present invention. The operating principle of the video processing system 100 according to some embodiments of the present invention is briefly described below with reference to FIG. 2

As shown in FIG. 2, in the video processing system 100 of FIG. 1, the video processing device 110 is configured as: a video frame sequence obtaining step, i.e., obtaining a video frame sequence comprised by a video to be processed; a scene classification identification step, i.e., performing scene classification identification on the video frame sequence so as to obtain a scene classification identification result of the video frame sequence; a smoothing process step, i.e., performing a smoothing process to the video frame sequence based on the scene classification identification result. As shown in FIG. 2, optionally, the video processing device 110 can be further configured to: obtain, via e.g., the network 130, an original video to be processed from e.g., the video collecting device 120 for subsequent processing.

As shown in FIG. 2, in the video processing system 100 as shown in FIG. 1, optionally, the video collecting device 120 can be configured to: firstly, collect the original video to be processed; then, transmit the original video to be processed to the video processing device 110 via the network 130, for the latter to perform video processing.

The video processing systems of FIG. 1 and FIG. 2 as well as the architectures thereof are only example application scenes of the video processing method according to some embodiments of the present invention. It should be appreciated that although the video processing device 110 and the video collecting device 120 herein are shown and described as separated structures, they can also be different parts of the same computing device. For example, the application scene or implementing environment of the video processing method according to some embodiments of the present invention can also only include the video collecting device 120 while not involving the video processing device 110, as long as the video collecting device 120 has hardware and/or software of a general computing device and can autonomously perform the steps of video serialization, scene classification identification, video frame smoothing on the basis of collecting videos. Optionally, the application scene or implementing environment of the video processing method according to some embodiments of the present invention can also only include the video processing device 110 while not involving the video collecting device. For example, it can be assumed that a video collecting device such as a camera is integrated in the video processing device (e.g., a notebook PC) 110, thus the corresponding video collecting step can be performed in the video processing device 110 directly, so as to avoid information transmission steps between a plurality of device.

Figure 3:
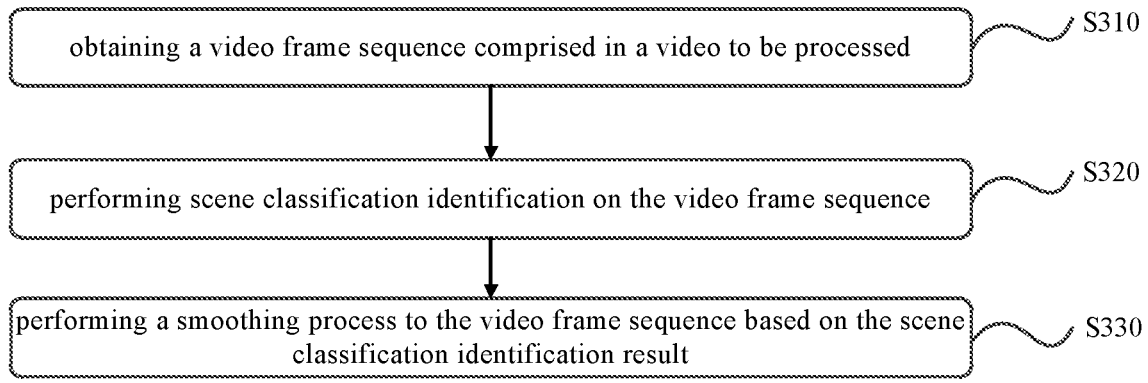
FIG. 3 shows a flow chart of a video processing method according to some embodiment of the present disclosure.

FIG. 3 schematically shows a flow chart of a video processing method according to some embodiments of the present disclosure. In some embodiments, the video processing method according to some embodiments of the present disclosure can be performed on e.g., the video processing device 110 as shown in FIG. 1 and FIG. 2. In some other embodiments, the video processing method can also be performed by combination of the video processing device 110 and the video collecting device 120 as shown in FIG. 1 and FIG. 2.

As shown in FIG. 3, the video processing method can comprise the steps of: S310, a video frame sequence obtaining step; S320, a scene classification identification step; and S330, a smoothing process step.

The steps S310-S330 as shown in FIG. 3 will be introduced in detail below.

As shown in FIG. 3, in S310—the video frame sequence obtaining step, obtaining a video frame sequence comprised by a video to be processed. In the video processing process, the processing of video pictures can come down to the processing of each video frame in the video frame sequence constituting the video. In other words, under certain conditions, the process of processing a dynamic video can be converted into processing of each static video frame image constituting the dynamic video, i.e., the video processing can be converted into image processing. Hence, in the video processing method according to some embodiments of the present disclosure, firstly, the static video frames constituting the video need to be extracted from the original video data obtained from a video collecting device such as a camera, for subsequent processing of the frame picture (i.e., static image) of the video frame. In some embodiments, the video frame sequence obtained (or extracted) in the video frame sequence obtaining step of S310 can include all video frames constituting the video to be processed, and can also be a part of the video frames, which depends on user's subjective requirements and/or objective actual conditions. For example, due to the large video, the overall processing has high requirements for software and hardware, which is objectively difficult to complete, hence, only a part of it can be processed. In some embodiments, the video frame sequence obtained in step S310 can be a sequence of temporally continuous video frames and can also include discontinuous video frames.

As shown in FIG. 3, in S320—the scene classification identification step, performing scene classification identification on the video frame sequence so as to obtain a scene classification identification result of the video frame sequence.

In some embodiments, the scene classification identification result of the video frame sequence includes respective scene classification results of at least part of the video frames in the sequence. After (all or at least part of) the video frame sequence comprised in the video to be processed is obtained, scene classification identification on the video frames in the video frame sequence needs to be performed so as to obtain scene classification results of all or part of the video frames in the sequence, thereby determining the video frame that needs to be smoothed and smoothing it. The scene classification identification of the video frame actually can be regarded as performing classification or scene identification on the video frame image according to a preset image content (a preset scene), i.e., to which kind of preset scene the video frame image belongs. The specific process of scene classification identification of video frame images can be generally carried out using a prebuilt scene classification model. In some embodiments, the step S320 can include: inputting at least part of video frames in the video frame sequence into a prebuilt scene classification model, so as to obtain a scene classification identification result of the at least part of video frames in the video frame sequence.

The prebuilt scene classification model can be obtained by training a classifier model. The classifier model is a function or model for mapping data to a given category so that it can be applied to data forecasting. The classifier model is a general term for the methods of classifying samples in data mining, including algorithms of decision tree, logistic regression, naive Bayes, neural network etc. The commonly used classifier model can include but not limited to K-Nearest Neighbors (KNN) model, random forest classifier model, eXtreme Gradient Boosting (XGBoost) model, Light Gradient Boosting Machine (LightGBM) model etc. Optionally, the classifier model can also use image classification model based on visual word bag model, so as to realize classification of the video frames and obtain the scene classification result.

In some embodiments, the prebuilt scene classification model includes general scene classification model pre-trained based on general scene images or customized scene classification model retrained based on scene images related to the video to be processed on the basis of the general scene classification model. The general scene classification model can be a classification model obtained after training the original classifier model based on the general and common scene images. The customized scene classification model is obtained by pre-customizing a scene of interest or a scene related to the video to be processed as a preset scene, and collecting corresponding pictures to retrain the general scene classification model, hence, such a retrained classification model is more suitable for the video to be processed. The classification result obtained by performing scene classification identification on the video frames using the general scene classifier model can ensure certain classification accuracy, however, the scene category cannot be customized; while the customized scene classification model, since the preset scene is customized according to the scene of interest or with respect to the video to be processed, can flexibly control the amount of the preset scene categories (for example, a large number of irrelevant scenes with low correlation with the video to be processed can be omitted), so as to ensure simplicity and accuracy of the classification identification result obtained in this way.

In some embodiments, the scene classification result of the video frame includes but not limited to a preset scene to which the video frame belongs and a classification probability value that the video frame belongs to each different preset scene. Specifically, the video frame sequence is inputted into the customized scene classification model, after model operation, the probability that each video frame in the video frame sequence belongs to various scenes is outputted. For example, 22 different types of scenes (i.e., preset scenes) are preset, for each inputted video frame, the model will output 22 classification probability values. These classification probability values can constitute a classification probability vector, 22 components thereof (i.e., the 22 classification probability values) respectively represent the probability that the inputted video frame belongs to each different type of preset scene, i.e., each preset scene corresponds to a probability.

In some embodiments, the scene classification identification result of each video frame in the video frame sequence can be represented as the following classification probability vector:

$$\vec{W_i} = (w_{i,1}, w_{i,2}, \ldots, w_{i,n})$$

wherein $\vec{W_i}$ represents the classification probability vector of the ith video frame in the video frame sequence; $w_{i,j}$ represents components of the classification probability vector $\vec{W_i}$, i.e., the probability that the ith video frame belongs to the jth preset scene, where j=1, 2, . . . , n; n represents the total number of the present scene.

Generally, the input of the prebuilt scene classification model according to some embodiments of the present disclosure is the video frame, the output is the probability that the video frame belongs to a preset scene respectively, i.e., the above classification probability vector. The final classification of the video frame or the preset scene to which it belongs can be directly obtained from the classification probability vector. For example, the preset scene to which the ith video frame in the video frame sequence belongs, obtained from forecasting of the scene classification model, can take the preset scene corresponding to the maximum component (i.e., the maximum classification probability value) in its classification probability vector $\vec{W_i} = (w_{i,1}, w_{i,2}, \ldots, w_{i,n})$, i.e., the preset scene corresponding to $\max\{w_{i,1}, w_{i,2}, \ldots, w_{i,n}\}$. For example, for the ith video frame, the mth component in its classification probability vector is the maximum after comparison. Hence, it can be obtained that the mth preset scene corresponding to $w_{i,m}$ is namely the scene to which the ith video frame belongs.

As shown in FIG. 3, in S330—the smoothing process step, performing a smoothing process to the video frame sequence based on the scene classification identification result.

In some embodiments, the smoothing process to the video frame sequence refers to performing a smoothing process to at least part of the video frames in the video frame sequence. Hence, before performing the smoothing process, the specific object to be smoothed needs to be determined, i.e., the video frame to be processed in the video frame sequence. Therefore, the smoothing process step can be divided into two substeps: the step of determining the video to be processed and the step of performing smoothing.

In some embodiments of the present disclosure, in order to select the video frame to be processed from the video frame sequence, firstly, it should be found out whether there is scene switching in the video frame sequence and when there is scene switching, the specific position of scene switching should be determined, so as to smooth it, because visual jump is easy to occur at the scene switching position when performing frame picture processing such as image enhancement. Specifically, the video frames in the video frame sequence can be compared frame by frame in chronological order, i.e., comparing whether the (identified) preset scenes corresponding to each two adjacent video frames are same (i.e., whether each two adjacent video frames belong to the same preset scene), so as to determine whether there is scene switching or transformation in the video sequence. For example, by comparing the scene classification result obtained from scene classification identification, there are two adjacent video frames $F_i$, $F_{i+1}$ ($F_i$ is the ith frame, $F_{i+1}$ is the i+1th frame) in the video frame sequence that correspond to different preset scenes, thus it can be deemed that there is scene switching or transformation in the video frame sequence. Meanwhile, the position of the scene switching (i.e., the video frame $F_{i+1}$ where scene switching occurs) and the preset scenes involved by the scene switching (i.e., the preset scenes to which the two adjacent video frames $F_i$, $F_{i+1}$ respectively belongs before and after the occurrence of scene switching) are determined. Thus, the video frame to be processed can be determined as at least one of the two video frames $F_i$, $F_{i+1}$. In some embodiments, for better smoothing effect and smoother transition, a plurality of video frames before and after the scene switching can also be determined as the smoothing objects, i.e., video frames to be processed. For example, the video frames to be processed can be determined as three video frames $F_{i-2}$, $F_{i-1}$, $F_i$ before scene switching or three video frames $F_{i+1}$, $F_{i+2}$, $F_{i+3}$ after scene switching. For example, $F_0$ can be used to represent the video frame to be processed, thus $F_0$ can include at least one of two adjacent video frames $F_i$, $F_{i+1}$ before and after the scene switching, or can also include a plurality of video frames before and after scene switching, such as $F_{i-2}$, $F_{i-1}$, $F_i$ or $F_{i+1}$, $F_{i+2}$, $F_{i+3}$ thereafter.

Optionally, in addition to taking the video frames before and after scene switching determined by comparing the scenes to which the adjacent video frames belong as the video frames to be processed, the video frames to be processed can also be determined directly by comparing the classification probability vectors of adjacent video frames. For example, if the classification probability vector of the ith video frame in the video frame sequence is $\vec{W_i} = (w_{i,1}, w_{i,2}, \ldots, w_{i,n})$, and the classification probability vector of the i+1th video frame in the video frame sequence is $\vec{W_{i+1}} = (w_{i+1,1}, w_{i+1,2}, \ldots, w_{i+1,n})$, the difference between the two can be computed, i.e., $\Delta \vec{W_i} = \vec{W_{i+1}} - \vec{W_i}$, so as to determine the video frames to be processed. For example, when $\Delta \vec{W_i}$ exceeds a certain threshold, it can be deemed that the scenes of the two adjacent video frames have changed. The result obtained from such a determination manner can be either consistent or inconsistent with the manner of the above comparison of scene categories of the video frames (i.e., the scene types to which the identified video frames belong).

After the video frames to be processed are selected from the video sequence, the video frames can be smoothed based on the scene classification identification result, so as to realize smooth transition of the video frame sequence, and avoid the problem of video playback jump at the scene switching due to image enhancement processing.

In some embodiments of the present disclosure, smoothing of the video frame to be processed in the video frame sequence comprises performing frame fusion processing on the video frame to be processed. The fusion processing can be represented in the following formula:

$$I_{fusion} = (w_{0,k}(I_0 \otimes T_k)) \oplus (w_{0,m}(I_0 \otimes T_m)) \quad (1)$$

wherein, $I_{fusion}$ represents a pixel value (or a pixel gray scale value) matrix of the fused video frame, $I_0$ represents a pixel value (or a pixel gray scale value) matrix of the video frame $F_0$ to be processed, $w_{0,k}$ represents the probability that the video frame $F_0$ to be processed belongs to the kth preset scene, $w_{0,m}$ represents the probability that the video frame $F_0$ to be processed belongs to the mth preset scene, $T_k$ represents a predetermined transformation matrix corresponding to the kth preset scene, $T_m$ represents a predetermined transformation matrix corresponding to the mth preset scene, $\oplus$ represents the fusion operation, $\otimes$ represents the transformation operation, where the kth preset scene and the mth preset scene respectively represent two different preset scenes (i.e., different preset scenes to which two adjacent video frames (e.g., $F_i$ and $F_{i+1}$) that are classified as different preset scenes belong respectively) involved by scene switching, i.e., preset scenes before and after the scene switching.

In the formula (1), $F_0 \otimes T_k$ or $F_0 \otimes T_m$ can represent an image processing such as image enhancement or transformation operation of the video frame to be processed for a corresponding preset scene (the kth preset scene or the mth preset scene), which can be a non-linear operation. The fusion operation $\oplus$ can be regarded as weighted average, i.e., performing weighted average on the result obtained from transformation of the frame $I_0$ to be processed relative to different preset scenes respectively (the kth preset scene and the mth preset scene), wherein the weights are $w_{0,k}$ and $w_{0,m}$. optionally, in some embodiments, besides the formula (1), other fusion processing manners can also be used to perform frame fusion on the frame to be processed so as to implement smoothing.

In the video processing method according to some embodiments of the present disclosure, by smoothing the video frame sequence based on the scene classification identification result, the video frames (e.g., one or more video frames near the scene switching position) that need to be processed (i.e., to be processed) due to scene switching can be detected, and then the video frames to be processed are smoothed based on the scene classification identification result (especially the scene classification identification results of two adjacent video frames which belong to different preset scenes before and after the scene switching occurs), so that the processed video frame sequence transitions naturally and smoothly before and after scene switching, so as to avoid the visual jump problem at the video scene transformation position caused by frame picture processing such as image enhancement (especially within the same shot), thereby making the processed video to be natural and smooth in the playback process, and significantly improving the user viewing experience.

Figure 4:
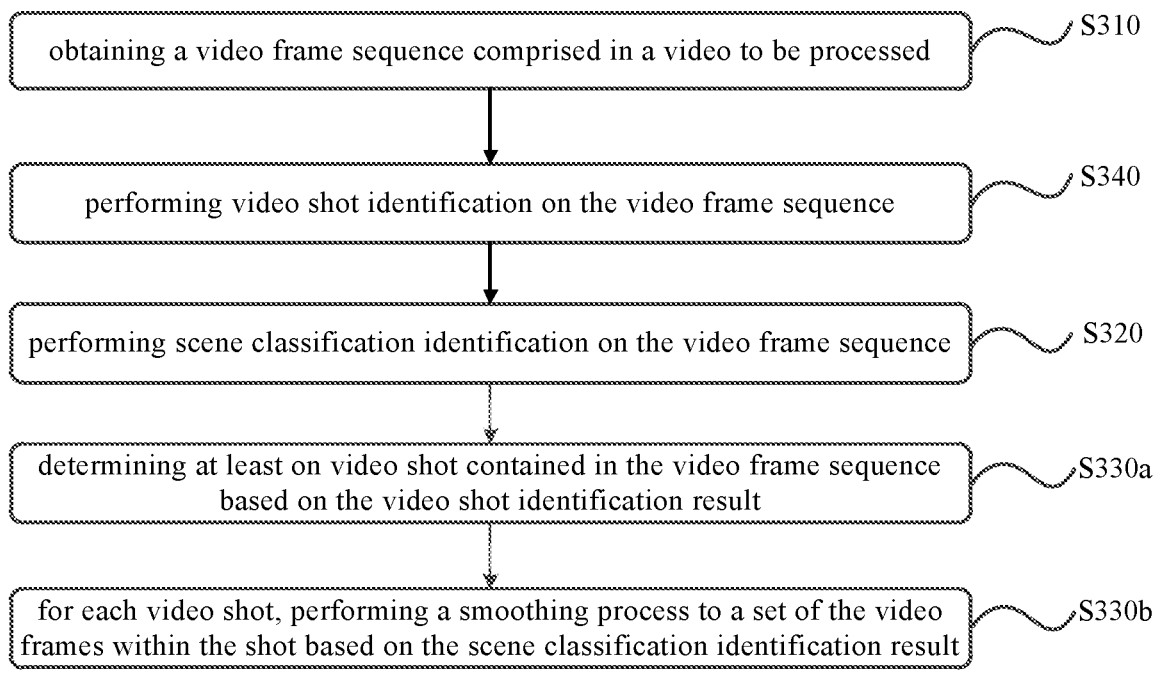
FIG. 4 shows a flow chart of a video processing method according to some embodiment of the present disclosure.

FIG. 4 schematically shows a flow chart of a video processing method according to some embodiments of the present disclosure. Compared to FIG. 3, the steps S310-S320 in FIG. 4 are same as those in FIG. 3. In addition, the video processing method as shown in FIG. 4 further comprises: S340, video shot identification step.

In the video processing method according to some embodiments of the present disclosure, the purpose of video shot identification or detection is to ensure that the scene switching scope is relatively stable. Because for scene switching in the same shot, the change of frame picture of the video frame sequence is relatively small, the scene classification result of the video frame sequence, e.g., the classification probability vector of each video frame will also change continuously, thus the processed video obtained from smoothing or fusion processing has a higher smoothness at the scene switching position. Hence, as shown in FIG. 4, a step S340 can be added before the step S320 (the scene classification identification step) (optionally before the step S330), i.e., performing smoothing within the same video shot so as to obtain a better smoothing result.

In S340—the video shot identification step, performing video shot identification on the video frame sequence, so as to obtain a video shot identification result of the video frame sequence.

The video shot identification can also be called video shot detection, video shot segmentation, video shot transformation detection, which means segmenting the video frame sequence constituting the video into a plurality of shots consisting of a set of uninterrupted frames with substantially the same content. The video shot identification is the basis of video hierarchy. Hence, the video shot identification can segment the video frame sequence into a plurality of video shots, each video shot can comprise one or more scenes. For example, a long shot in the video may contain many content changes, i.e., a plurality of video scenes. When performing frame picture processing within such a long shot, the visual jump problem caused by image processing such as image enhancement at the scene switching position in the video frame sequence still has to be considered. In some embodiments, the video shot identification result can include one or more video shots comprised by the video frame sequence, video frames comprised in each video shot, and video shots to which each video frame in the video frame sequence belongs. The method for video shot identification mainly includes but not limited to: pixel-based algorithm, histogram-based algorithm, motion feature-based algorithm, edge feature-based algorithm etc. Through the video shot identification, each shot contained in the video frame sequence can be obtained, i.e., each video shot contain which video frames or each video frame in the video frame sequence belongs to which shot, thereby laying foundation for subsequent determination of scene switching within the same shot and corresponding video frames to be processed so as to realize smoothing.

In some embodiments, the video shot identification manner can be realized based on the interframe similarity between adjacent frames in the video frame sequence. The specific identification manner can include the following two: the first one is counting and computing similarity based on the histogram of the adjacent video frame images and performing shot detection based on the similarity; the second one is constructing a similarity curve by computing similarity information of a plurality of adjacent frames and detecting the shots through the stagnation point(s) of the curve. See FIGS. 7A and 7B for the above two specific video shot detection or identification manners.

As shown in FIG. 4, the step S330 (i.e., the smoothing process step) as shown in FIG. 3 can comprise the steps of:
S330a, determining, based on the video shot identification result, at least one video shot contained in the video frame sequence;
S330b, for each video shot in the at least one video shot, performing a smoothing process to a set of the video frames within the video shot based on the scene classification identification result.

In some embodiments, as stated in S330a, all shots contained in the video frame sequence and the video frames contained in each video shot can be obtained based on the video shot identification result. Whereas at least one video shot in S330a can be all shots contained in the video frame sequence, and can also be at least part of the video shots.

After segmenting the video frame sequence into video shots, as stated in S330b, the video frame sets or sequences contained in each video shot can be smoothed, i.e., determining, based on the scene classification identification result, scene switching in the same video shot and thus determining video frame to be processed, and smoothing the video frame to be processed. In some embodiments, the video frames to be processed at least include video frames before and after the scene switching occurs or the previous frame thereof, i.e., two adjacent video frames before and after the scene switching occurs. For example, as stated above, if the two adjacent video frames before and after the scene switching occurs are $F_i$, $F_{i+1}$, it can be determined that the video frame to be processed is at least one of the two adjacent video frames $F_i$, $F_{i+1}$. In some embodiments, for a better smoothing effect and more smooth transition, a plurality of video frames before and after or near the scene switching can also be determined as the smoothing objects, i.e., video frames to be processed. For example, the video frames to be processed can include three video frames $F_{i-2}$, $F_{i-1}$, $F_i$ before scene switching and three video frames $F_{i+1}$, $F_{i+2}$, $F_{i+3}$ thereafter.

Figure 5:
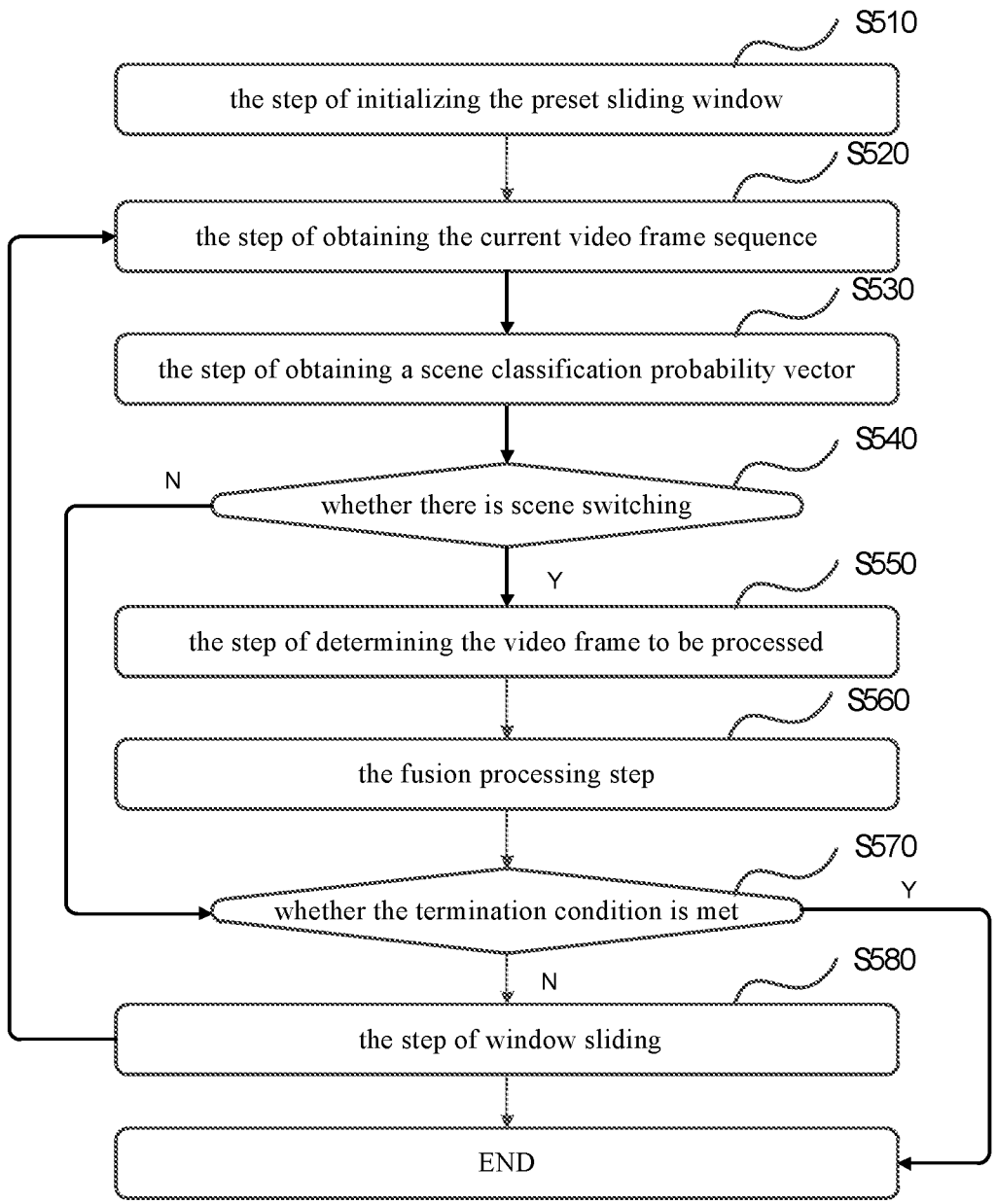
FIG. 5 shows a flow chart of a video processing method according to some embodiment of the present disclosure.

FIG. 5 schematically shows an example flow chart of step S330 in the video processing method according to some embodiments of the present disclosure as shown in FIG. 3. As shown in FIG. 5, the step S330—the smoothing process step may comprise:
S510, a preset sliding window initialization step: setting a current position of a preset sliding window as an initial position of a time axis of the video frame sequence;
S520, a current video frame sequence obtaining step: obtaining, using a preset sliding window of a current position, a current video frame sequence in the video frame sequence corresponding to the current position;
S530, a classification probability vector obtaining step: obtaining, based on the scene classification identification result, a classification probability vector of each video frame in the current video frame sequence and a preset scene to which it belongs, wherein components in the classification probability vector of each video frame respectively represent probability that the video frame belongs to a corresponding preset scene;
S540, scene switching determination step: determining whether there is scene switching in the current video frame sequence, i.e., determining whether the current video frame sequence contains a first video frame sequence and a second video frame sequence adjacent to each other, wherein each video frame in the first video frame sequence belongs to a first preset scene, and each video frame in the second video frame sequence belongs to a second preset scene different from the first preset scene, if yes, proceed to S550, otherwise, proceed to S570;
S550, the step of determining the video frame to be processed: in response to the current video frame sequence containing a first video frame sequence and a second video frame sequence, determining a video frame to be processed (which may include the video frame in the first video frame sequence or the second video frame sequence);
S560, fusion processing step: performing a fusion processing to the video frame to be processed based on the first preset scene, the second preset scene and the classification probability vector of the video frame to be processed so as to realize smoothing;
S570, the step of determining the termination condition: determining whether the termination condition is met, i.e., determining whether the current position of the preset sliding window reaches the terminal point of the time axis of the video frame sequence, if yes, finish the smoothing, otherwise, proceed to S580;

S580, window sliding step: sliding the preset sliding window along a time axis corresponding to the at least part of the video frame sequence with a preset sliding step, and setting the position of the preset sliding window after sliding as a current position, proceed to step S520.

In the steps as shown in FIG. 5, the preset sliding window refers to a window for extracting the current video frame sequence from the video frame sequence contained in the video to be processed, wherein the current video frame sequence is namely a video frame sequence corresponding to the current position of the preset sliding window. The purpose of the preset sliding window is to process the entire video frame sequences of the video to be processed one by one in batches, so as to simplify the video processing process. For example, after serializing the video (stream) to be processed, a plurality of video frames to be processed each time, i.e., the current video frame sequence, can be extracted from the serialization processing result (i.e., the video frame sequence) of the video through the sliding window.

Figure 6:
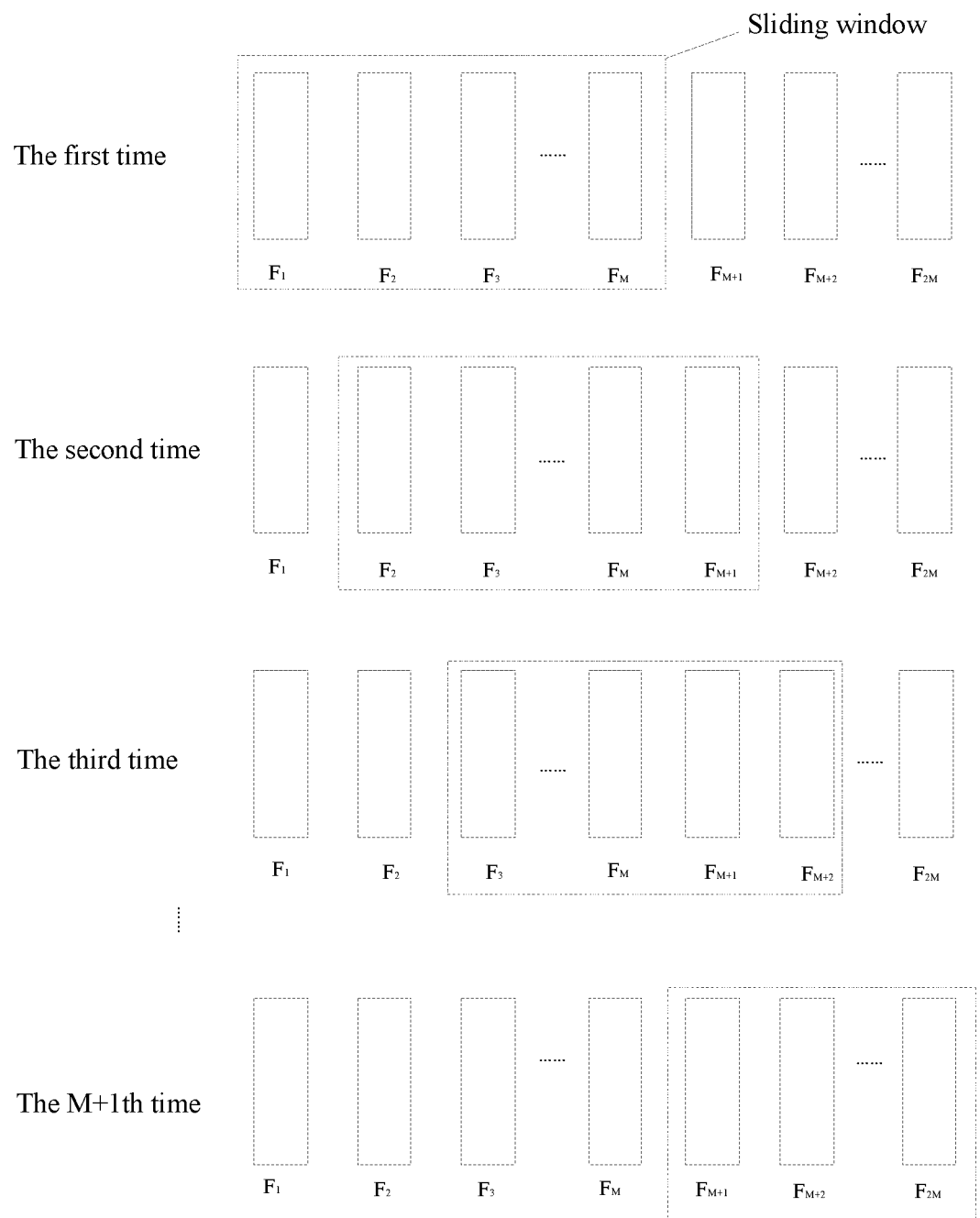
FIG. 6 schematically shows an example process of extracting a video frame using a preset sliding window in a video processing method according to some embodiment of the present disclosure.

FIG. 6 schematically shows a preset sliding window according to some embodiments of the present disclosure and an example process of extracting video frames thereof. As shown in FIG. 6, the dashed block represents the sliding window, the solid rectangular blocks $F_1, F_2, F_3, \ldots, F_{2M}$ represent respective video frames in the video frame sequence contained in the video to be processed. As shown in FIG. 6, assume that the video frame sequence contained in the video to be processed totally has 2M video frames, the start frame is $F_1$, followed by $F_2, F_3, \ldots, F_{2M}$; while the length of the preset sliding window can be preset as M video frames, i.e., the window can cover M video frames; the preset step is one video frame, i.e., the preset sliding window can extract M video frames each time, and each slide advances 1 frame along the time axis of the video frame sequence. As shown in FIG. 6, in a first video frame extraction, the initial position of the preset sliding window is at the start position of the video frame sequence or the corresponding time axis, hence, the preset sliding window at the initial position obtains a set of M continuous video frame $\{F_1, F_2, F_3, \ldots, F_M\}$ from the video frame sequence, which constitute a current video frame sequence of the first video extraction; in a second video frame extraction, the preset sliding window slides to the right according to a step of 1 video frame (i.e., the window moves to the right by one frame), and obtains again M continuous video frames $\{F_2, F_3, \ldots, F_{M+1}\}$, which constitute a current video frame sequence of the second video extraction; and so on, until the M+1th extraction is finished to obtain M continuous video frames $\{F_{M+1}, F_{M+2}, \ldots, F_{2M}\}$ as a current video frame sequence of the M+1th extraction. The length and the sliding step of the preset sliding window can be preset based on actual conditions and are not limited to the situations as shown in FIG. 6. In some embodiments, the length of the preset sliding window can be greater than the preset sliding step, so as to avoid losing or leaving out individual frames in the video frame sequence while extracting the current video frame (which may influence the entire smoothing effect of the video frame sequence). Optionally, in an embodiment as shown in FIG. 5, the preset sliding step can be greater than half of the length of the preset sliding window and less than the length of the preset sliding window, in this way, it can be ensured to improve the efficiency of video frame extraction and processing while avoiding frame loss.

As shown in FIG. 5, for the current video frame sequence extracted each time, the processing as shown in S530-S560 is performed on it to obtain a corresponding smoothing effect. As shown in S580, after processing the current video frame sequence each time, the preset sliding window slides with a preset step so as to update the current video frame sequence, and then the steps of S530-S560 are performed again, until all video frames in the video frame sequence contained in the video to be processed are processed. For example, it can be determined whether the circle processing is terminated through S570—the cycle termination condition determination step (i.e., whether all video frames are processed). As shown in FIG. 6, after the last video frame extraction is finished, the current position of the sliding window has reached the terminal point of the time axis, hence, it can be determined whether the video frame extraction is finished or not by determining whether the current position of the preset sliding window reaches or exceeds the terminal point of the time axis, i.e., if the current position reaches or exceeds the terminal point of the time axis, the extract is finished, and the smoothing process is terminated; otherwise, it shows that the video frames in the video frame sequence are not be fully extracted, thus, the window movement continues through step S580 to extract the video frame for subsequent processing.

As shown in FIG. 5, after the current video frame sequence is extracted, smoothing can be performed through steps S530-560. The classification probability vector obtaining step S530 is used to, through the scene classification identification result, obtain a classification probability vector (wherein the components in the classification probability vector of each video frame respectively represent probability that the video frame belongs to a corresponding preset scene) of each video frame of the current video frame sequence and a preset scene to which it belongs for use in subsequent steps. The specific ideas of current video frame sequence smoothing may include: firstly determining whether there is scene switching in the current video frame sequence, and then determining the video frame to be processed based on the scene switching, finally realizing smoothing through fusion processing. As shown in S540, it is determined, based on the classification probability vector of each video frame and the specific scene classification (or the preset scene to which the video frame belongs obtained from scene classification identification), whether there are at least two different scenes in the current video frame sequence, if yes, continue the step S540 to perform determination of the video frame to be processed, otherwise, terminate the current processing of the current video frame, and proceed to S570 (to perform the next current video frame processing or terminate the entire processing process directly according to the determination on whether the video frame extraction is finished). As shown in S550, in response to presence of the scene switching, the video frames to be processed can be determined as a video frame before and after the scene switching, i.e., adjacent first video sequence and/or second video sequence. The first video sequence and the second video sequence can include one or more video frames. Finally, as shown in step S560, the video frames to be processed (i.e., the first and/or the second video frame sequence) are fused according to the classification probability vectors of the frames before and after the scene switching (especially two adjacent video frames before and after the switching, i.e., two adjacent video frames belonging to different scenes). The fusion processing can be implemented using the formula (1) of the present disclosure. Optionally, the fusion processing is not limited to the formula (1) and can be implemented in other ways.

The processing process of the current video frame sequence extracted for the first time in the smoothing process as shown in FIG. 5 will be described briefly below with reference to FIG. 6. As shown in FIG. 6, the length of the preset sliding window is M video frames, hence, the current video frame sequence extracted for the first time includes M continuous video frames $\{F_1, F_2, F_3, \ldots, F_M\}$. As shown in step S530, firstly, the classification probability vector of the current frame sequence and the preset scene to which it belongs are obtained based on the scene classification identification result. For example, suppose that there are totally n preset scenes, it is obtained from scene classification identification (e.g., a prebuilt scene classification model) that the classification probability vector of the ith video frame Fi in the current video frame sequence $\{F_1, F_2, F_3, \ldots, F_M\}$ is $\overline{w}_i = (w_{i,1}, w_{i,2}, \ldots, w_{i,n})$, wherein i=1, 2, ..., n, and the scene classification of each video frame, i.e., the preset scene to which it belongs, can be obtained based on the classification probability vector. Secondly, as shown in step S540, it is determined, based on the scene classification identification result of the current video frame sequence, whether there is scene switching. Specifically, it can be determined whether there is scene switching by determining whether there are two adjacent video frame sequences (i.e., the first video frame sequence and the second video frame sequence) in the current video frame sequence $\{F_1, F_2, F_3, \ldots, F_M\}$ and both belong to different preset scenes respectively. For example, if it can be seen from the scene classification identification of S530 that $F_1$, $F_2$, $F_3$ are all first preset scene while $F_4, \ldots F_M$ all belong to the second preset scene different from the first preset scene, it indicates that there are two adjacent video frame sequences (i.e., the first video frame sequence and the second video frame sequence) that belong to different scenes, wherein $\{F_1, F_2, F_3\}$ can be the first video frame sequence, and $\{F_4, \ldots, F_M\}$ can be the second video frame sequence, thus it can be determined that there is scene switching in the current video frame sequence $\{F_1, F_2, F_3, \ldots, F_M\}$. Suppose that it is not found in the current video frame sequence $\{F_1, F_2, F_3, \ldots, F_M\}$ two adjacent first video frame sequence and second video frame sequence of different scenes, the processing process of the current video frame sequence extracted this time can be terminated, then proceed to the subsequent step S570, i.e., it is determined whether to proceed to the next cycle or terminate the cycle directly (the entire processing process) based on whether the cycle termination condition is true. As shown in step S550, in response to determining in S540 that there is scene switching (i.e. there are two adjacent first and second video frame sequences that belong to different preset scenes respectively), the video frame to be processed can be determined based on the first and second video frame sequences. For example, when $\{F_1, F_2, F_3\}$ is the first video frame sequence and $\{F_4, \ldots, F_M\}$ is the second video frame sequence, each video frame in the first video frame sequence or the second video frame sequence can be taken as the video frame to be processed, i.e., taking $F_1$, $F_2$, $F_3$ as the video frames to be processed or $F_4, \ldots, F_M$ as the video frames to be processed, it can also be only the video frame $F_4$ or its previous frame $F_3$ where scene switching occurs.

In some embodiments, S550—the step of determining the video frame to be processed can comprise: in response to the current video frame sequence comprising a first video frame sequence and a second video frame sequence, determining the video frame to be processed as a first video frame in the first video frame sequence adjacent to the second video frame sequence or a second video frame in the second video frame sequence adjacent to the first video frame sequence. Thus determined video frame to be processed only includes at least one of the first video frame and the second video frame which are adjacent to each other, and which are before and after scene switching, and which belong to different preset scenes. Thus, such a video frame to be processed as the fusion processing object can reflect the scene switching position that needs to be processed more accurately, moreover, since only one video frame (i.e., the first or the second video frame) needs to be processed, the processing process is simpler and the data processing efficiency is improved In some embodiments, S560—the fusion processing step (i.e., performing a fusion processing to the video frame to be processed based on the first preset scene, the second preset scene and the classification probability vector of the video frame to be processed, so as to realize smoothing) can comprise:

obtaining, based on the classification probability vector of the video frame to be processed, a first classification probability that the video frame to be processed belongs to a first preset scene and a second classification probability that the video frame to be processed belongs to a second preset scene;

The video frame to be processed is fused through the following formula:

$$I_{fusion} = (w_{0,1}(I_0 \otimes T_1)) \oplus (w_{0,2}(I_0 \otimes T_2)) \quad (2)$$

Wherein $I_{fusion}$ represents a pixel value matrix of the fused video frame, $I_0$ represents a pixel value matrix of the video frame to be processed, $w_{0,1}$ represents the first classification probability, $w_{0,2}$ represents the second classification probability, $T_1$ represents a predetermined transformation matrix corresponding to the first preset scene, $T_2$ represents a predetermined transformation matrix corresponding to the second preset scene.

The above formula (2) is obtained based on the formula (1), the specific explanation can make reference to the above corresponding description of the formula (1).

Figure 7:
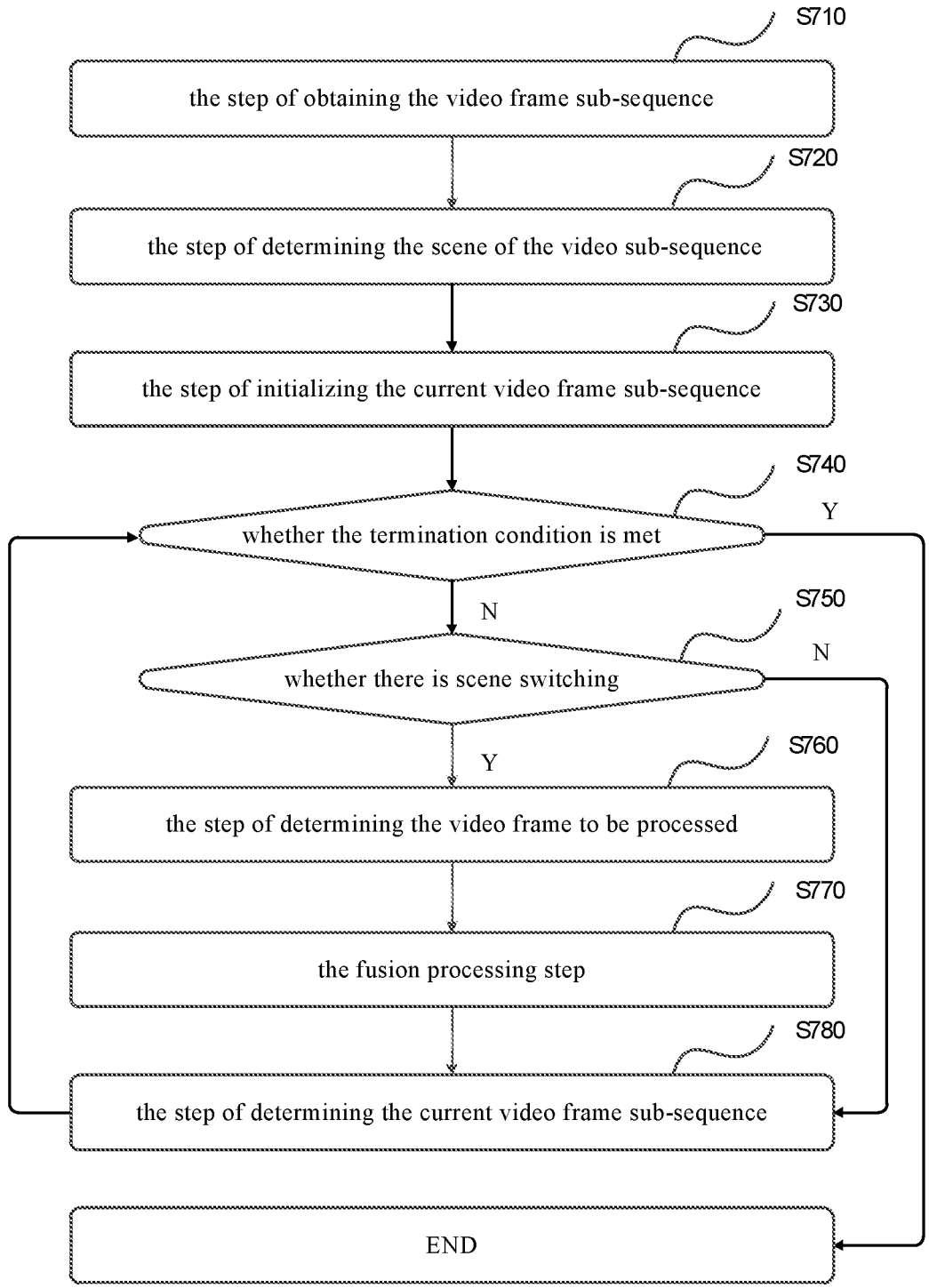
FIG. 7 shows a flow chart of a video processing method according to some embodiment of the present disclosure.

FIG. 7 schematically shows an example flow chart of step S330 in the video processing method according to some embodiments of the present disclosure as shown in FIG. 3. As shown in FIG. 7, the step S330—the smoothing step can comprise:

S710, the video frame sub-sequence obtaining step: sliding a preset sliding window along a time axis corresponding to the video frame sequence with a preset sliding step, so as to obtain N video frame sub-sequences of the video frame sequence in chronological order, i.e., the first sub-sequence to the Nth video frame sub-sequence, wherein N is a positive integer greater than or equal to 2;

S720, the video frame sub-sequence scene determination step: determining, based on the scene classification identification result, a preset scene to which each video frame sub-sequence belongs and a classification probability vector of each video frame in each video frame sub-sequence, the preset scene to which each video frame sub-sequence belongs representing a preset scene to which the last video frame in the video frame sub-sequence belongs;

S730, the initialization step of the current video frame sub-sequence: taking the first video frame sub-sequence of the plurality of video frame sub-sequences as the current video frame sub-sequence;

S740, the cycle termination condition determination step: determining whether the termination condition is met, i.e., determining whether the current video frame sub-sequence is the Nth video frame sub-sequence in the plurality of video frame sub-sequences, if yes, the smoothing is terminated, otherwise, proceed to S750;

S750, the scene switching determination step: determining whether there is scene switching, i.e., for the current video frame sub-sequence, determining whether the video frame sub-sequence and the adjacent next video frame sub-sequence belong to the same preset scene, if yes, proceed to S780, otherwise, proceed to S760;

S760, the step of determining the video frame to be processed: in response to the current video frame sub-sequence and the adjacent next video frame sub-sequence belonging to different preset scenes, determining the video frame to be processed as each video frame in the adjacent next video frame sub-sequence and obtaining a classification probability vector of the video frame to be processed;

S770, the fusion processing step: performing a fusion processing to the vide frame to be processed based on the preset scenes to which the current video frame sub-sequence and the adjacent next video frame sub-sequence belong as well as the classification probability vector of the video frame to be processed, so as to realize smoothing, proceed to S780.

S780, the step of determining the current video frame sub-sequence: in response to a video frame sub-sequence and an adjacent next video frame sub-sequence belonging to the same preset scene or the fusion processing being finished, taking the adjacent next video frame sub-sequence as the current video frame sub-sequence, proceed to S740.

The step S710 is substantially same as the video frame extracting step as shown in FIG. 5, but it is not required herein to slide to the terminal point of the time axis, which indicates that at least part of the video frames in the video frame sequence can be processed. In S720, in order to process each video frame in the video frame sub-sequence as a whole, the preset scene to which each video frame in the video frame sub-sequence belongs can be set as the preset scene of the video frame sub-sequence. If all video frames in a video frame sub-sequence belong to the same preset scene, the preset scene of the video frame sub-sequence is certainly also the same preset scene. If at least two video frames in a sub-sequence belong to different preset scene respectively, the preset scene to which any video frame in the sub-sequence belongs can be set as the preset scene of the sub-sequence. Considering the sliding direction of the preset sliding window, the preset scene of a back video frame (e.g., the last video frame) in the video frame sub-sequence can be chosen as the preset scene of the sub-sequence, because the scene of the back video frame has a high probability of transformation, such a setting can avoid missing the identification of video frames to be processed that actually have scene switching when processing the sub-sequence as a whole.

Compared to the manner of processing with frames as objects in FIG. 5, the smoothing process of FIG. 7 takes the whole video sub-sequence as the processing object, which significantly improves the video processing efficiency.

The smooth processing step as shown in FIG. 7 takes each sub-sequence in a plurality of video frame sub-sequences obtained using the preset sliding window as a whole for processing, which has a higher efficiency than processing frame by frame. Specifically, as shown in steps S710-S780, each video frame sub-sequence is taken as a processing object in the processing process of FIG. 7, it is determined, by comparing the preset scenes to which every two adjacent video frame sub-sequences belong, whether there is scene switching between these two video frame sub-sequences. Subsequently, through the scene switching determination result, i.e., in response to presence of scene switching, the video frame to be processed (i.e., each video frame in the latter of the adjacent video frame sub-sequence) is determined based on the scene classification identification result and the video frame to be processed is fused based on the scene classification result (e.g., the classification probability vector) of the video frame in two adjacent video frame sub-sequences using algorithm such as the formula (1). Compared to processing frame by frame, the process as shown in FIG. 7, by performing video processing on each of the plurality of video frame sub-sequences as a whole, can effectively save video processing, especially smoothing or fusing time, thereby improving the video processing efficiency.

Figure 8A:
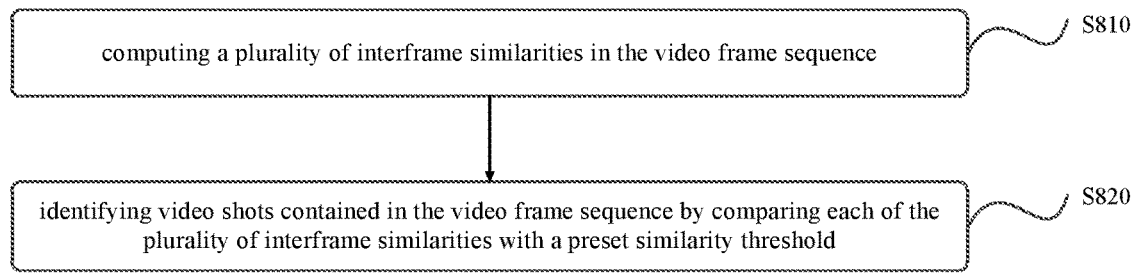
FIGS. 8A and 8B shows flow charts of a video processing method according to some embodiment of the present disclosure respectively.
Figure 8B:
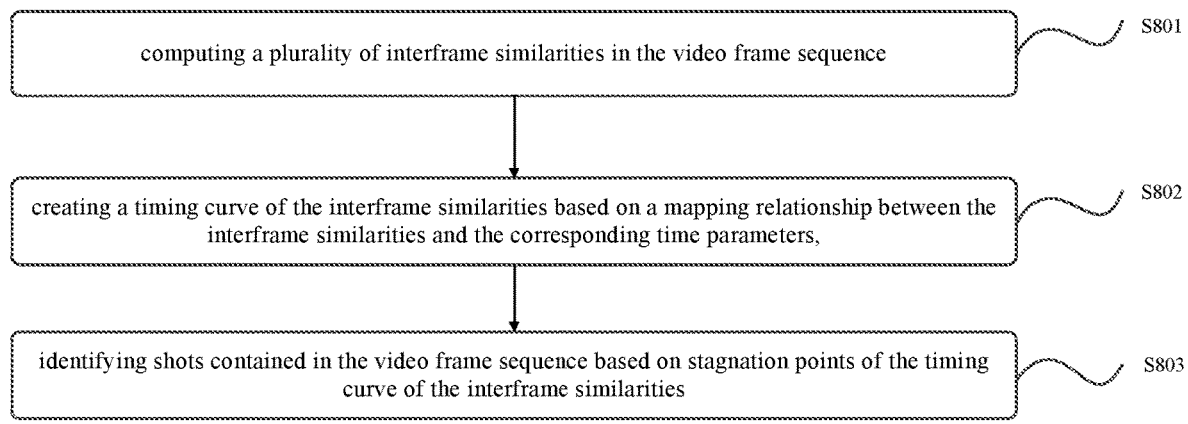

FIGS. 8A and 8B respectively show the example process of the step S340 as shown in FIG. 4.

As shown in FIG. 8A, S340—the video shot identification step (performing video shot identification on a video frame sequence so as to obtain a video shot identification result of the video frame sequence) as shown in FIG. 4 can comprise:

S810, computing a plurality of interframe similarities in the video frame sequence, the interframe similarities representing similarity between two adjacent video frames in the video frame sequence;

S820, identifying, by comparing each of the plurality of interframe similarities with a preset similarity threshold, video shots contained in the video frame sequence.

Similar as the scene switching identification, the video shot identification to the video frame sequence for example can be realized by determining, based on the interframe similarity between two adjacent video frames in the video frame sequence, whether the video shot corresponding to the video frame sequence has changes. For example, it can be determined, by comparing the preset similarity threshold with the interframe similarity, whether there is shot switching or segmentation in the sequence. Then the video shot where each video frame in video frame sequence locates can be determined. The interframe similarity can be obtained from various algorithms, e.g., histogram-based shot segmentation algorithm etc. In some embodiments, the step S810 comprises: computing the plurality of interframe similarities using the histogram-based shot segmentation algorithm.

As shown in FIG. 8B, S340—the video shot identification step as shown in FIG. 4 can also comprise:

S801, computing a plurality of interframe similarities in the video frame sequence, the interframe similarities representing similarity between two adjacent video frames in the video frame sequence;

S802, creating a timing curve of the interframe similarities based on a mapping relationship between the plurality of interframe similarities and corresponding time parameters in the video frame sequence;

S803, identifying, based on stagnation point(s) of the timing curve of the interframe similarities, video shots contained in the video frame sequence.

In some embodiments, as shown in FIG. 8B, the video shots can be identified based on stagnation point(s) of the timing curve of the interframe similarities. Based on the basic mathematical knowledge, the stagnation point(s) of the curve may be the extreme point, hence, it can be determined, based on stagnation point(s) of the timing curve of the interframe similarities, at which time points the interframe similarities reach the minimal value, shot switching may occur in adjacent video frames corresponding to these time points, thereby realizing video shot identification.

The flow charts and the block diagrams in the drawings illustrate the architectures, functions and operations that may be carried out by the systems, methods and computer program products according to various embodiments of the present disclosure. In this regard, each block in the flow chart or the block diagram can represent a part of a module, a program segment or a code, the part of the module, the program segment or the code comprises one or more executable instructions for implementing the specified logical functions. It shall be also noted that in some alternative implementations, the functions labeled in the blocks may also occur in a sequence different from that labeled in the drawings. For example, two successively represented blocks actually can be performed essentially in parallel, they can also be performed in a reverse order sometimes, which depends on the functions involved. It shall be further noted that each block in the block diagram and/or the flow chart as well as the combination of the blocks in the block diagram and/or the flow chart can be carried out by the dedicated hardware based system for implementing the specified functions or operations, or be carried out by the combination of dedicated hardware and the computer instructions.

Figure 9:
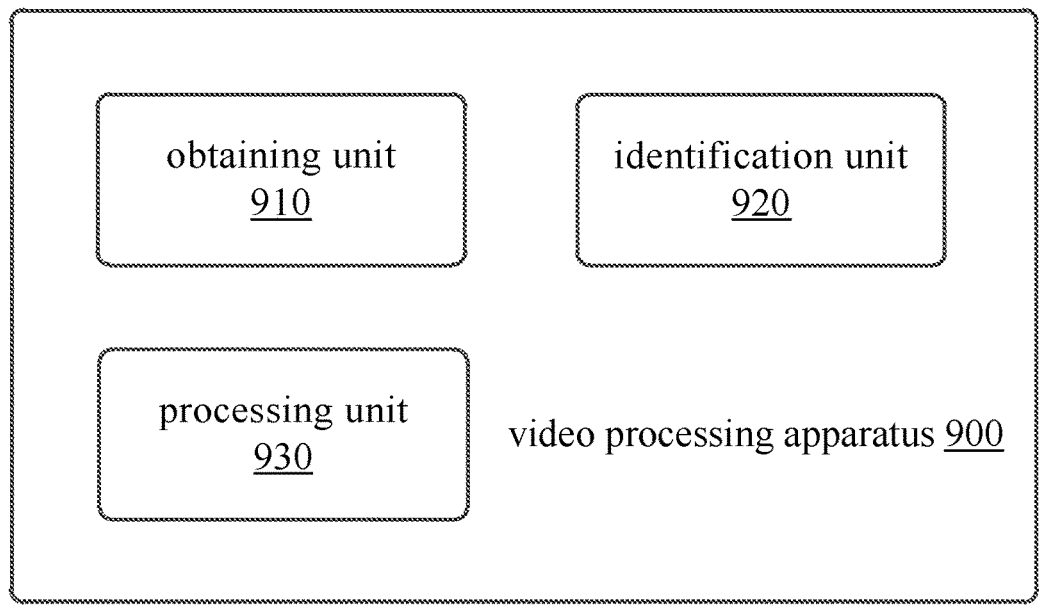
FIG. 9 shows a structural block diagram of a video processing apparatus according to some embodiments of the present disclosure.

FIG. 9 shows a structural block diagram of a video processing apparatus according to some embodiments of the present disclosure. The video processing apparatus 900 as shown in FIG. 9 can correspond to the video processing device 110 as shown in FIG. 1. As shown in FIG. 9, the video processing apparatus 900 can comprise an obtaining module 910, an identification module 920, a processing module 930.

The obtaining module 910 can be configured to obtain a video frame sequence comprised in the video to be processed. The identification module 920 can be configured to perform scene classification identification on the video frame sequence so as to obtain a scene classification identification result of the video frame sequence. The processing module 930 can be configured to smooth the video frame sequence based on the scene classification identification result.

In the video processing apparatus according to some embodiments of the present disclosure, by smoothing the video frame sequence based on the scene classification identification result, the video frames (e.g., one or more video frames near the scene switching position) that need to be processed (i.e., to be processed) due to scene switching can be detected, and then the video frames to be processed are smoothed based on the scene classification identification result (especially the scene classification identification results of two adjacent video frames which belong to different preset scenes before and after the scene switching), so that the processed video frame sequence transitions naturally and smoothly before and after scene switching, so as to avoid the visual jump problem at the video scene transformation position caused by frame picture processing such as image enhancement (especially within the same shot), thereby making the processed video to be natural and smooth in the playback process, and significantly improving the user viewing experience.

It should be appreciated that the units or modules recited in the above apparatus correspond to the steps in the method described with reference to FIG. 3. Thus, the operations and features described above with respect to the method are also suitable for the above apparatus and the units contained therein, which will not be repeated here. The above apparatus can be implemented in the browser of the computing device or other security projects in advance, and can also be loaded into the browser of the computing device or its security project by downloading or the like. The corresponding units in the above apparatus can cooperate with the units in the computing device so as to implement the solutions of the embodiments of the present disclosure.

For several modules or units mentioned in the above detailed description, this division is not mandatory. In fact, according to the implementation of the present disclosure, the features and functions of two or more modules or units described above can be embodied in one module or unit. Conversely, the feature and function of one module or unit described above can be embodied by a plurality of modules or units by further division.

Figure 10:
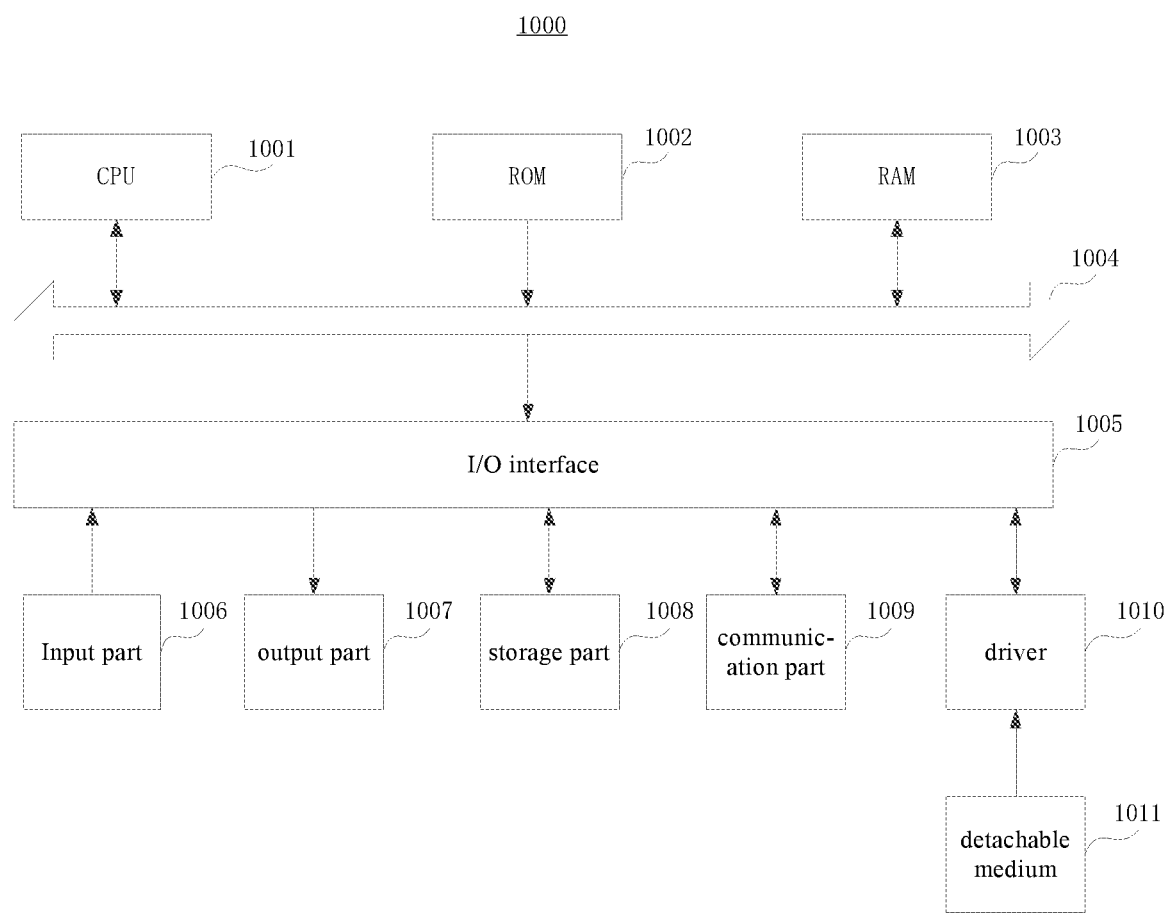
FIG. 10 shows a structural block diagram of a computing device according to some embodiments of the present disclosure.

FIG. 10 schematically shows an example block diagram of a computing device 1000 according to some embodiments of the present disclosure. The computing device 1000 can represent a device for implementing various means or modules described herein and/or carrying out various methods described herein. The computing device 1000 can be for example a server, a desktop computer, a laptop computer, a tablet computer, a smart phone or any other appropriate computing devices or computing systems, which can include devices of various levels from full resource devices with large storage and processing resources to low resource devices with limited storage and/or processing resources. In some embodiments, the video processing apparatus 900 described with respect to FIG. 9 can be implemented in one or more computing devices 1000 respectively.

As shown in FIG. 10, the computing device can comprise a central processing unit (CPU) 1001, which can execute various appropriate actions and processing based on the programs stored in a read-only memory (ROM) 1002 or the programs loaded from a storage part 1008 to a random access memory (RAM) 1003. In RAM 1003, various programs and data required by system operations are also stored. The CPU 1001, the ROM 1002 and the RAM 1003 are connected to each other through a bus 1004. An input/output (I/O) interface 1005 is also connected to the bus 1004.

The following components are connected to the I/O interface 1005: an input part 1006 such as keyboard, mouse etc.; an output part 1007 such as a cathode-ray tube (CRT), a liquid crystal display (LCD) and a loudspeaker etc.; a storage part 1008 including hard disk etc.; and a communication part 1009 including network interface cards such as LAN card, modem etc. The communication part 1009 performs communication processing via networks such as Internet. A driver 1010 is also connected to the I/O interface 1005 as needed. A detachable medium 1011, such as a magnetic disc, an optical disc, a magnetic optical disk, a semiconductor memory and so on, is mounted on the driver 1010 as needed, so that the computer program read from it can be installed into the storage part 1008 as needed.

Particularly, according to an embodiment of the present disclosure, the above process described with reference to the flow charts can be implemented as a computer software program. For example, an embodiment of the present disclosure comprises a computer program product, which comprises a computer program carried on a machine-readable medium, the computer program comprising program codes for carrying out the method as shown in the flow chart. In such an embodiment, the computer program can be down-loaded and installed from the network through the communication part 1009, and/or installed from the detachable medium 1011. When the computer program is executed by the central processing unit (CPU) 1001, the functions defined in the system of the present disclosure are performed.

It should be noted that the computer readable medium as shown in the present disclosure can be a computer readable signal medium or a computer readable storage medium or any combination of the above two. The computer readable storage medium for example can be, but not limited to: electrical, magnetic, optical, electromagnetic, infrared, or semiconductor systems, apparatuses or devices, or any combination of the above. The more specific examples of the computer readable storage medium can include but not limited to: an electrical connection with one or more conductors, a portable computer disk, a hard disk, a random access memory (RAM), a read only memory (ROM), a erasable programmable read only memory (EPROM or a flash memory), an optical fiber, a portable compact disk read only memory (CD-ROM), a light storage device, a magnetic storage device, or any appropriate combination of the above. In the present disclosure, the computer readable storage medium can be any tangible medium containing or storing programs, which programs can be used by the instruction execution system, apparatus or device or by combinations thereof. Moreover, in the present disclosure, the computer readable signal medium can include a data signal that propagates in baseband or as part of a carrier wave, in which computer-readable program codes are carried. Such propagated data signal can take various forms, including but not limited to electromagnetic signal, optical signal or any appropriate combination of the above. The computer readable signal medium can also be any computer readable medium other than the computer readable storage medium. The computer readable medium can send, propagate or transmit programs used by the instruction execution system, apparatus or device or used by combinations thereof. The program codes contained on the computer readable medium can be transmitted by any appropriate mediums, including but not limited to: wireless, wire, optical cable, RF, etc., or any appropriate combination of the above.

The units or modules described in the embodiments of the present disclosure can be implemented by software or hardware. The units or modules described can also be arranged in a processor. For example, it can be described as: a processor, comprising a video frame obtaining module, a scene classification identification module and a smoothing module etc. The names of these units or modules do not constitute limitation to the units or modules per se under certain circumstances.

As another aspect, the present disclosure further provides a computer readable storage medium. The computer readable storage medium can be either comprised in the computing device described in the above embodiments, or can exist alone without being assembled into the computing device. The above computer readable storage medium stores one or more programs, which are used by one or more processors for performing the video processing method described in the present disclosure.

The above description is merely preferred embodiments of the present disclosure and explanations on the applied technical principles. Those skilled in the art should understand that the disclosure scope involved in the present disclosure is not limited to the technical solution formed by particular combinations of the above technical features, it should also cover, in the case of not departing from the preceding concept disclosed, other technical solutions formed by any combination of the above technical features or the equivalent features thereof, for example, technical solutions formed by mutual replacement of the above features and technical features disclosed in the present disclosure (but not limited to) with similar functions.

In the description of this Specification, the terms "one embodiment", "some embodiments", "an example", "a specific example", or "some examples" intend to indicate that the specific features, structure, materials or characteristics described in combination with the embodiment or example are comprised in at least one embodiment or example of the present disclosure. In this Specification, the schematic expressions of the above terms need not be directed to the same embodiment or example. Moreover, the specific features, structure, materials or characteristics described can be combined in an appropriate manner in any one or more embodiments or examples. In addition, in the case of without contradiction, those skilled in the art can combine different embodiments or examples as well as features of different embodiments or examples described in this Specification.

It should be appreciated that the respective parts of the present disclosure can be implemented by hardware, software, firmware or their combinations. In the above implementation, a plurality of steps or methods can be carried out by software or firmware that is stored in the memory and executed by an appropriate instruction execution system. For example, if it is carried out by hardware, it can be carried out by any of the following well known technologies of the art or their combinations: discrete logic circuit with logic gate circuit for realizing logic function on data signal, application specific integrated circuit with suitable combinational logic gate circuit, programmable gate array, field programmable gate array and so on.

The ordinary skilled person in the art can understand that all or part of the steps of the method in the above embodiment can be performed by program instruction related hardware. The program can be stored in a computer readable storage medium. When executed, the program is able to carry out one or a combination of the steps of the method embodiment.

In addition, the functional units in each embodiment of the present disclosure can be integrated in one processing module, or each unit physically exists separately, or two or more units are integrated in one module. The above integrated module can be either implemented in the form of hardware or in the form of a software functional module. The integrated module, if implemented in the form of a software functional module and sold or used as an independent product, can also be stored in a computer readable storage medium.

The invention claimed is:

1. A video processing method, comprising:
   obtaining a video frame sequence comprised in a video to be processed;
   performing scene classification identification on the video frame sequence so as to obtain a scene classification identification result of the video frame sequence; and
   performing a smoothing process to the video frame sequence based on the scene classification identification result,
   wherein the performing a smoothing process to the video frame sequence based on the scene classification identification result comprises:
   sliding a first preset sliding window along a time axis corresponding to the video frame sequence with a first preset sliding step until sliding to an end of the time axis, so as to obtain a plurality of current video frame sequences from the video frame sequence;

obtaining, based on the scene classification identification result, a classification probability vector of each video frame in the plurality of current video frame sequences and a preset scene to which it belongs, wherein components in the classification probability vector of each video frame respectively represent probability that the video frame belongs to a corresponding preset scene; and for each current video frame sequence in the plurality of current video frame sequences, performing operations comprising:

determining whether the current video frame sequence comprises a first video frame sequence and a second video frame sequence adjacent to each other, wherein each video frame in the first video frame sequence belongs to a first preset scene and each video frame in the second video frame sequence belongs to a second preset scene different from the first preset scene;

in response to the current video frame sequence comprising the first video frame sequence and the second video frame sequence, determining a video frame to be processed; and performing a fusion processing to the video frame to be processed based on the first preset scene, the second preset scene and the classification probability vector of the video frame to be processed so as to achieve a smoothing process to it, wherein the performing a fusion processing the video frame to be processed so as to achieve a smoothing process based on the first preset scene, the second preset scene and the classification probability vector of the video frame to be processed, comprises:

obtaining, based on the classification probability vector of the video frame to be processed, a first probability that the video frame to be processed belongs to the first preset scene and a second probability that it belongs to the second preset scene; and performing a fusion processing to the video frame to be processed by formula:

$$I_{fusion} = (w_{0,1}(I_0 \otimes T_1)) \oplus (w_{0,2}(I_0 \otimes T_m))$$

wherein $I_{fusion}$ represents a pixel value matrix of a fused video frame, $I0$ represents a pixel value matrix of the video frame to be processed, $w_{0,1}$ represents the first probability, $w_{0,2}$ represents the second probability, $T_1$ represents a predetermined transformation matrix corresponding to the first preset scene, $T_2$ represents a predetermined transformation matrix corresponding to the second preset scene, or wherein the performing a smoothing process to the video frame sequence based on the scene classification identification result comprises:

sliding a second preset sliding window along a time axis corresponding to the video frame sequence with a second preset sliding step so as to obtain N video frame sub-sequences of the video frame sequence in chronological order comprising a first sub-sequence to a Nth video frame sub-sequence, wherein N is a positive integer greater than or equal to 2;

determining, based on the scene classification identification result, a preset scene to which each video frame sub-sequence belongs and a classification probability vector of each video frame in each video frame sub-sequence, the preset scene to which each video frame sub-sequence belongs representing a preset scene to which a last video frame in the video frame sub-sequence belongs, components in the classification probability vector of each video frame respectively representing probability that the video frame belongs to a corresponding preset scene;

for each video frame sub-sequence from a first video frame sub-sequence to an N−1th video frame sub-sequence, performing the following operations in sequence according to a sequence number:

determining whether the preset scenes to which the video frame sub-sequence and a next adjacent video frame sub-sequence belong are same;

in response to the preset scenes to which the video frame sub-sequence and the next adjacent video frame sub-sequence belong being different, determining each video frame in the next adjacent video frame sub-sequence as a video frame to be processed; and performing a fusion processing to the video frame to be processed based on the preset scenes to which the video frame sub-sequence and the next adjacent video frame sub-sequence belong and the classification probability vector of the video frame to be processed so as to achieve a smoothing process to it.

2. The method according to claim 1, wherein the obtaining a video frame sequence comprised in a video to be processed comprising:

obtaining a whole video frame sequence corresponding to a video to be processed;

performing video shot identification on the whole video frame sequence so as to obtain a video shot identification result of the whole video frame sequence, determining at least one video shot comprised in the whole video frame sequence based on the video shot identification result; and performing a smoothing process, for each video shot in the at least one video shot, on a set of video scenes within the each video shot based on the scene classification identification result.

3. The method according to claim 1, wherein the first preset sliding step is between half of a length of the first preset sliding window and the length of the first preset sliding window.

4. The method according to claim 1, wherein the in response to the current video frame sequence comprising the first video frame sequence and the second video frame sequence, determining the video frame to be processed, comprises:

in response to the current video frame sequence comprising the first video frame sequence and the second video frame sequence, determining a first video frame, in the first video frame sequence, adjacent to the second video frame sequence or a second video frame, in the second video frame sequence, adjacent to the first video frame sequence as the video frame to be processed.

5. The method according to claim 1, wherein the performing scene classification identification on the video frame sequence so as to obtain a scene classification identification result of the video frame sequence comprises:

inputting at least part of video frames in the video frame sequence into a prebuilt scene classification model, so as to obtain a scene classification identification result of the at least part of video frames in the video frame sequence.

6. The method according to claim 5, wherein the prebuilt scene classification model comprises:
   a general scene classification model pre-trained based on general scene images, or
   a customized scene classification model pre-trained based on scene images related to the video frame sequence.

7. The method according to claim 2, wherein the performing video shot identification on the whole video frame sequence so as to obtain a video shot identification result of the whole video frame sequence comprises:
   computing a plurality of interframe similarities in the whole video frame sequence, the interframe similarities representing similarity between two adjacent video frames in the whole video frame sequence; and
   identifying video shots comprised in the whole video frame sequence by comparing each of the plurality of interframe similarities with a preset similarity threshold.

8. The method according to claim 7, wherein the computing a plurality of interframe similarities in the whole video frame sequence comprises:
   computing the plurality of interframe similarities using a histogram-based shot segmentation algorithm.

9. The method according to claim 2, wherein the performing video shot identification on the whole video frame sequence so as to obtain a video shot identification result of the whole video frame sequence comprises:
   computing a plurality of interframe similarities in the whole video frame sequence, the interframe similarities representing similarity between two adjacent video frames in the whole video frame sequence;
   creating a timing curve of the interframe similarities based on a mapping relationship between the plurality of interframe similarities and corresponding time parameters in the whole video frame sequence; and
   identifying video shots comprised in the whole video frame sequence based on stagnation points of the timing curve of the interframe similarities.

10. A video processing apparatus, comprising:
   an obtaining module, configured to obtain a video frame sequence comprised in a video to be processed;
   an identification module, configured to perform scene classification identification on the video frame sequence so as to obtain a scene classification identification result of the video frame sequence; and
   a processing module, configured to perform a smoothing process to the video frame sequence based on the scene classification identification result,
   wherein the smoothing process to the video frame sequence based on the scene classification identification result comprises:
   sliding a first preset sliding window along a time axis corresponding to the video frame sequence with a first preset sliding step until sliding to an end of the time axis, so as to obtain a plurality of current video frame sequences from the video frame sequence;
   obtaining, based on the scene classification identification result, a classification probability vector of each video frame in the plurality of current video frame sequences and a preset scene to which it belongs, wherein components in the classification probability vector of each video frame respectively represent probability that the video frame belongs to a corresponding preset scene; and
   for each current video frame sequence in the plurality of current video frame sequences, performing operations comprising:
   determining whether the current video frame sequence comprises a first video frame sequence and a second video frame sequence adjacent to each other, wherein each video frame in the first video frame sequence belongs to a first preset scene and each video frame in the second video frame sequence belongs to a second preset scene different from the first preset scene;
   in response to the current video frame sequence comprising the first video frame sequence and the second video frame sequence, determining a video frame to be processed; and
   performing a fusion processing to the video frame to be processed based on the first preset scene, the second preset scene and the classification probability vector of the video frame to be processed so as to achieve a smoothing process to it,
   wherein the performing a fusion processing the video frame to be processed so as to achieve a smoothing process based on the first preset scene, the second preset scene and the classification probability vector of the video frame to be processed, comprises:
   obtaining, based on the classification probability vector of the video frame to be processed, a first probability that the video frame to be processed belongs to the first preset scene and a second probability that it belongs to the second preset scene; and
   performing a fusion processing to the video frame to be processed by formula:

$$I_{fusion}=(w_{0,1}(I_0 \otimes T_1)) \oplus (w_{0,2}(I_0 \otimes T_2))$$

wherein $I_{fusion}$ represents a pixel value matrix of the fused video frame, I0 represents a pixel value matrix of the video frame to be processed, $w_{0,1}$ represents the first probability, $W_{0,2}$ represents the second probability, $T_1$ represents a predetermined transformation matrix corresponding to the first preset scene, $T_2$ represents a predetermined transformation matrix corresponding to the second preset scene,
   or wherein the smoothing process to the video frame sequence based on the scene classification identification result comprises:
   sliding a second preset sliding window along a time axis corresponding to the video frame sequence with a second preset sliding step so as to obtain N video frame sub-sequences of the video frame sequence in chronological order comprising a first sub-sequence to a Nth video frame sub-sequence, wherein N is a positive integer greater than or equal to 2;
   determining, based on the scene classification identification result, a preset scene to which each video frame sub-sequence belongs and a classification probability vector of each video frame in each video frame sub-sequence, the preset scene to which each video frame sub-sequence belongs representing a preset scene to which a last video frame in the video frame sub-sequence belongs, components in the classification probability vector of each video frame respectively representing probability that the video frame belongs to a corresponding preset scene;
   for each video frame sub-sequence from the first video frame sub-sequence to the N−1th video frame sub-sequence, performing the following operations in sequence according to a sequence number:
   determining whether the preset scenes to which the video frame sub-sequence and a next adjacent video frame sub-sequence belong are same;

in response to the preset scenes to which the video frame sub-sequence and the next adjacent video frame sub-sequence belong being different, determining each video frame in the next adjacent video frame sub-sequence as a video frame to be processed; and performing a fusion processing to the video frame to be processed based on the preset scenes to which the video frame sub-sequence and the next adjacent video frame sub-sequence belong and the classification probability vector of the video frame to be processed so as to achieve a smoothing process to it.

11. A computing device, comprising:

one or more processors; and one or more memories with instructions stored thereon which instructions, when executed on at least one of the one or more processors, cause the one or more processors to carry out the method as claimed in claim 1.

12. A non-transitory computer readable storage medium, with computer readable instructions stored thereon which, when executed, carry out the method as claimed in claim 1.

* * * * *